US012512607B2

(12) United States Patent
Kausar et al.

(10) Patent No.: US 12,512,607 B2
(45) Date of Patent: Dec. 30, 2025

(54) MILLIMETER WAVE RECONFIGURABLE ANTENNA WITH SINGLE LAYERED UNIT CELL PATTERN

(71) Applicant: BOISE STATE UNIVERSITY, Boise, ID (US)

(72) Inventors: Shafaq Kausar, Boise, ID (US); Hani Mehrpouyan, Boise, ID (US)

(73) Assignee: BOISE STATE UNIVERSITY, Boise, ID (US)

( * ) Notice: Subject to any disclaimer, the term of this patent is extended or adjusted under 35 U.S.C. 154(b) by 1176 days.

(21) Appl. No.: 17/375,820

(22) Filed: Jul. 14, 2021

(65) Prior Publication Data

US 2024/0405452 A1 Dec. 5, 2024

Related U.S. Application Data

(60) Provisional application No. 63/051,521, filed on Jul. 14, 2020.

(51) Int. Cl.
*H01Q 25/00* (2006.01)
*H01Q 21/06* (2006.01)

(52) U.S. Cl.
CPC ......... *H01Q 25/001* (2013.01); *H01Q 21/062* (2013.01); *H01Q 21/065* (2013.01)

(58) Field of Classification Search
CPC ... H01Q 25/001; H01Q 21/062; H01Q 21/065
See application file for complete search history.

(56) References Cited

U.S. PATENT DOCUMENTS

2007/0075910 A1* 4/2007 Kudou ................. H05K 9/0005 343/841
2010/0085272 A1* 4/2010 Legay .................. H01Q 19/104 343/912

OTHER PUBLICATIONS

Tayebi et al, "Dynamic Beam Shaping Using a Dual-Band Electronically Tunable Reflectarray Antenna," in IEEE Transactions on Antennas and Propagation, vol. 63, No. 10, pp. 4534-4539, Oct. 2015 (Year: 2015).*

* cited by examiner

*Primary Examiner* — Dieu Hien T Duong
(74) *Attorney, Agent, or Firm* — Parsons Behle & Latimer

(57) ABSTRACT

A system may include a substrate and an array of unit cells for a multi-cell antenna printed on the substrate. Each unit cell may include a first trace having an outer perimeter that forms a cross shape and an inner perimeter that encloses an area within the first trace. Each unit cell may further include a second trace having an outer perimeter that is completely enclosed by and does not contact the inner perimeter of the first trace. Each unit cell may also include a varactor electrically connecting the first trace to the second trace. A method may include receiving an electromagnetic signal at the array of unit cells and controlling a capacitance of the varactor of each unit cell to result in one or more directed beams.

18 Claims, 9 Drawing Sheets

MILLIMETER WAVE RECONFIGURABLE ANTENNA WITH SINGLE LAYERED UNIT CELL PATTERN

CROSS-REFERENCE TO RELATED APPLICATIONS

This application claims the benefit of U.S. Provisional Patent Application No. 63/051,521, filed Jul. 14, 2020, and entitled "Millimeter Wave Reconfigurable Antenna with Single Layered Unit Cell Pattern," the contents of which are incorporated by reference herein in their entirety.

GOVERNMENT LICENSE RIGHTS

This invention was made with government support under contract no. NNX17AJ94A awarded by NASA. The government has certain rights in the invention.

FIELD OF THE DISCLOSURE

This disclosure is generally related to the field of reconfigurable antennas and, in particular, to millimeter wave reconfigurable antennas with single layered unit cell patterns.

BACKGROUND

Demand in communication for high data rates and improved spectral efficiency is increasing. Due to technological advancements, increased bandwidth demands are expected to grow. To cater to the increasing demand for higher data rates, increased channel capacity, and improved spectral efficiency, smart antennas and reconfigurable antennas have become a topic of great interest.

Smart antennas and reconfigurable antennas may rely on spatial beam forming techniques to perform targeted communication between devices. These antennas have been proposed for various applications including 5G mm wave wireless communication, satellite communication, and aerospace and military applications. Typical solutions for smart antennas may be based on phased array antennas. Typical phased array antennas may have high power consumption (due to power hungry components), complicated beam forming architectures, high losses (due to parasitic radiations in feed networks), and overall lower efficiencies. Efficient, low profile and cost-effective smart antennas are desirable for everyday communication systems.

Reflect array antennas may be a viable alternative to phased array antennas in terms of cost, efficiency, and simplicity. Reflect array antenna may include a feed radiator and array of microstrip elements which are designed to re-radiate an incoming wave with an appropriate phase shift to generate a collimated beam in a desired direction. To design a reconfigurable, reflect array antenna, a tuning mechanism may dynamically tune phasing elements of the array. Different approaches have been proposed to design a tunable unit cell. However, typical approaches may include complex structures, discrete tuning abilities, and reliability issues. These factors may limit useful applications for reflect array antennas and may result in higher costs during manufacturing. Other disadvantages may exist.

SUMMARY

Disclosed herein is a novel unit cell for a reflect array antenna that has been designed by combining the versatility of three different geometries including square patches, cross dipoles, and quads. The unit cell may be made up of an inner square and an outer hybrid square patch printed on a dielectric substrate. For phase tuning, a varactor diode may be inserted between inner and outer squares. The unit cell may include a single varactor diode. The unit cell described herein may be less complicated, cost-effective, and simpler to manufacture than typical reflect array configurations.

In an embodiment, a device includes a substrate having a unit cell for a multi-cell antenna printed on the substrate. The unit cell includes a first trace having an outer perimeter that forms a cross shape and an inner perimeter that encloses an area within the first trace. The unit cell further includes a second trace having an outer perimeter that is completely enclosed by and does not contact the inner perimeter of the first trace. The device also includes a varactor diode electrically connecting the first trace to the second trace.

In some embodiments, the unit cell omits any additional varactors electrically connecting the first trace to the second trace. In some embodiments, the first trace and the second trace are printed on the substrate as a single layer. In some embodiments, the device includes a grounding plane, and a via passing through the substrate and electrically connecting the second trace to the grounding plane. In some embodiments, the device includes a radio frequency (RF) choke circuit, and a via passing through the substrate and electrically connecting the first trace to the RF choke circuit. In some embodiments, a capacitance of the varactor is configured to be selectively set between 0.02 pF and 0.25 pF. In some embodiments, a length and width of the unit cell are about 0.35 times a wavelength of a signal for which the multi-cell antenna is designed. In some embodiments, the first trace and the second trace include silver, copper, aluminum, tin, or a combination thereof.

In an embodiment, a system includes a substrate and an array of unit cells for a multi-cell antenna printed on the substrate. Each unit cell includes a first trace having an outer perimeter that forms a cross shape and an inner perimeter that encloses an area within the first trace. Each unit cell further includes a second trace having an outer perimeter that is completely enclosed by and does not contact the inner perimeter of the first trace. Each unit cell also includes a varactor electrically connecting the first trace to the second trace.

In some embodiments, the system includes a feed radiator configured to direct electromagnetic radiation toward the array of unit cells. In some embodiments, the system includes an RF chain coupled to the feed radiator. In some embodiments, the system includes a beam controller configured to select a capacitance of the varactor of each unit cell. In some embodiments, the capacitance of the varactor of each unit cell results in a corresponding phase shift of an electromagnetic signal reflected by each unit cell. In some embodiments, the phase shift of the electromagnetic signal reflected by each unit cell results in one or more directed beams from the array of unit cells. In some embodiments, each unit cell omits any additional varactors electrically connecting the first trace to the second trace. In some embodiments, the first trace and the second trace are printed on the substrate as a single layer.

In some embodiments, the system includes a grounding plane, and vias passing through the substrate, where for each unit cell, the vias electrically connect the second trace to the grounding plane. In some embodiments, the system includes a RF choke circuit for each unit cell, and vias passing through the substrate, where, for each unit cell, the vias electrically connect the first trace to the RF choke circuit.

In an embodiment, a method includes receiving an electromagnetic signal at an array of unit cells for a multi-cell antenna printed on a substrate. Each unit cell includes a first trace having an outer perimeter that forms a cross shape and an inner perimeter that encloses an area within the first trace. Each unit cell further includes a second trace having an outer perimeter that is completely enclosed by and does not contact the inner perimeter of the first trace. Each unit cell also includes a varactor electrically connecting the first trace to the second trace. The method further includes controlling a capacitance of the varactor of each unit cell to result in a corresponding phase shift of a reflected electromagnetic signal, where the reflected electromagnetic signal of each unit cell results in one or more directed beams from the array of unit cells. In some embodiments, the method may include directing the electromagnetic signal at the array of unit cells from a feed radiator.

Figure 1:
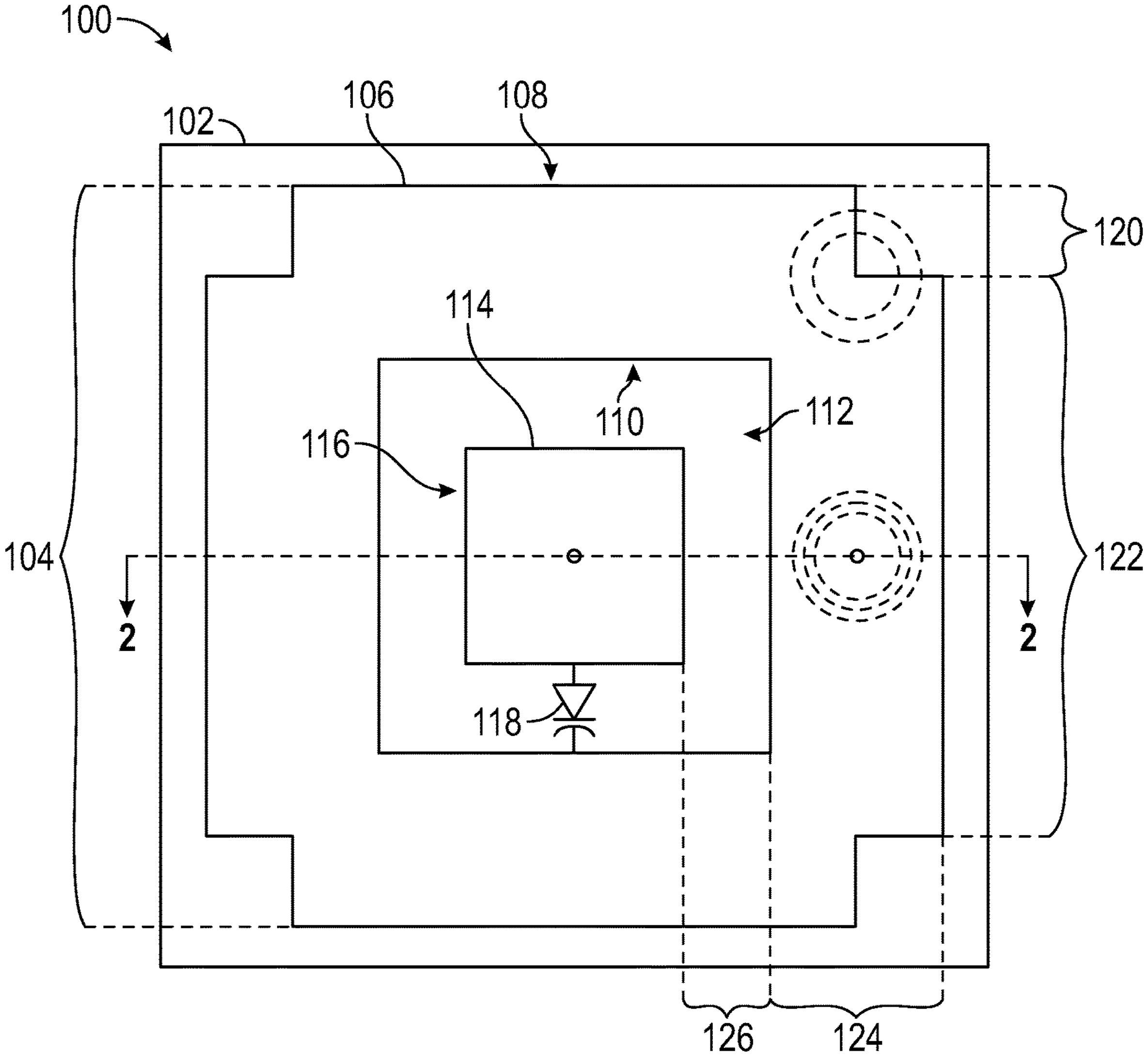
FIG. 1 is a top view of an embodiment of an antenna device including a unit cell.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

The multi-cell antenna device and system described herein may exhibit lower power consumption as compared to typical directed antenna and reconfigurable antenna designs. For example, using a single varactor of multiple unit cells for phase shifting may consume less power than more complex phase shifting circuits relied on in typical phased array designs. Another benefit is that the described multi-cell antenna device and system may have lower manufacturing costs than typical designs due to their simplicity. In some cases, the described designs may be up to 20 or 30 times less expensive. Further, because the described multi-cell antenna device and system may be designed in a single layer, it may have a lower profile than other typical designs and may be more suitable for thin devices. Other benefits may also exist.

Referring to FIG. 1, an embodiment of an antenna device 100 is depicted. The antenna device 100 may include a substrate 102 and a unit cell 104 printed on the substrate 102. In practice, multiple unit cells may be printed on the substrate 102 which may be used as a multi-cell antenna. For description purposes, the device 100 has been reduced, such that the unit cell 104 is the only unit cell depicted.

The unit cell 104 may include a first trace 106 and a second trace 114. The first trace 106 may have an outer perimeter 108 that forms a cross shape. For example, the outer perimeter 108 may have a rectangular shape with corners of the outer perimeter removed along a corner dimension 120 while the outer perimeter is extended along an edge dimension 122. As shown in FIG. 1, when applied to all four sides, this creates a cross shape. The first trace 106 may have a width 124 between the outer perimeter 108 and an inner perimeter 110. The dimensions 120, 122, 124 shown in FIG. 1 may be adjusted depending on a particular application. For example, while the cross shape depicted in FIG. 1 is comparatively thick, in other cases, the cross shape may be thinner and may more closely resemble a plus sign. The cross shape may impart some properties of both a cross dipole antenna element and a square patch antenna element.

The first trace 106 may further have an inner perimeter 110 that encloses an area 112 within the first trace 106. In this disclosure, the term "enclose," is used in a two-dimensional sense, meaning that the inner perimeter 110 completely surrounds the area 112 along the plane of the trace 106. The unit cell 104 may include a second trace 114, within the area 112, having an outer perimeter 116 that is completely enclosed by and does not contact the inner perimeter 110 of the first trace 106. The second trace 114 may be separated from the first trace 106 by a separation distance 126, which may be experimentally determined based on a desired application. The outer perimeter 116 of the second trace 114 may have a square shape. In this way, the device 100 may have increased bandwidth properties associated with double square element (quads) antenna configurations. By combining the properties of a cross dipole configuration, a square patch configuration, and quads, the conducting pattern of the unit cell 104 may result in excellent phase characteristics. Further, the first trace 106 and the second trace 114 may be printed on the substrate 102 as a single layer. This may greatly reduce the costs of manufacturing.

In a particular, non-limiting example, the length and width of the unit cell 104 may be approximately 0.35 times a wavelength for which the multi-cell antenna is designed. The inner patch may have a length and width of approximately 0.3 times a wavelength. These dimensions are only provided as one example. Depending on an intended application and further analysis of a frequency response multiple other possibilities exist. In a particular case, the antenna device 100 may be designed for a frequency of about 11 GHz. The first trace 106 and the second trace 114 may include silver, copper, aluminum, tin, another conductive metal, or a combination thereof.

The unit cell 104 may include a varactor 118 that electrically connects the first trace 106 to the second trace 114. The varactor 118 may be biased by voltage potentials applied across the first trace 106 and the second trace 114 to enable phase tuning. The varactor 118, may be implemented as a varactor diode or, in some cases, as a combination of circuits. The unit cell 104 may include only a single varactor and may omit any additional varactors electrically connecting the first trace 106 to the second trace 114. By omitting additional varactors, the unit cell 104 may achieve phase changes with much less complexity than current phase change reflector array antennas. In a particular, non-limiting example, a capacitance of the varactor 118 may be configured to be selectively set between 0.02 pF and 0.25 pF by applying a control voltage between 0 V to 20 V across the varactor 118. Other possibilities may exist.

Figure 2:
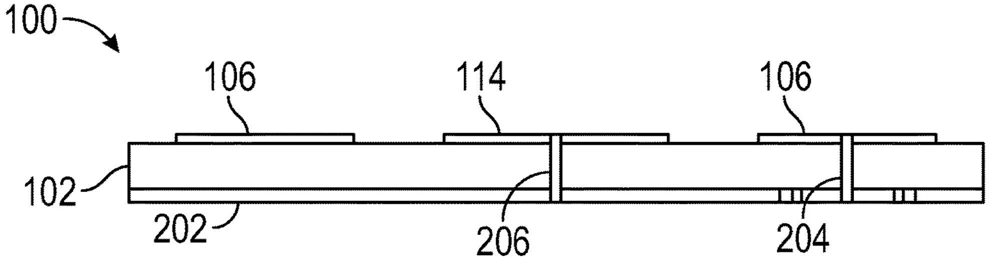
FIG. 2 is a cross-section view of an embodiment of an antenna device including a unit cell.

Referring to FIG. 2, a cross-section of the embodiment of the antenna device 100 is depicted. As shown in FIG. 2, a ground plane 202 may be positioned on the substrate 102 opposite the first trace 106 and the second trace 114. A first via 204 may be electrically connected to the first trace 106 and may pass through the substrate 102. Likewise, a second via 206 may be electrically connected to the second trace 114 and may pass through the substrate 102. The second via 206 may be electrically connected to the ground plane. The vias 204, 206 may be used to bias the varactor 118.

Figure 3:
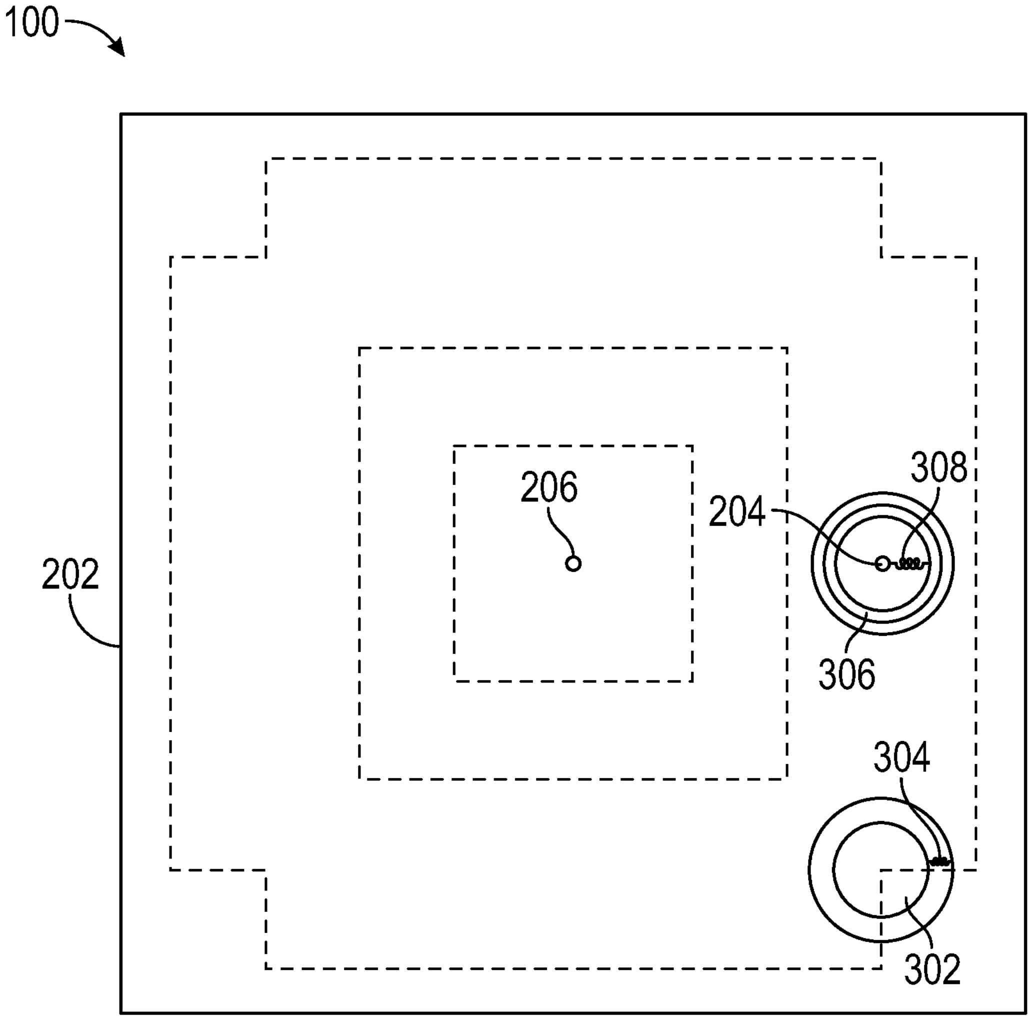
FIG. 3 is a bottom view of an embodiment of an antenna device including a unit cell.
Figure 4:
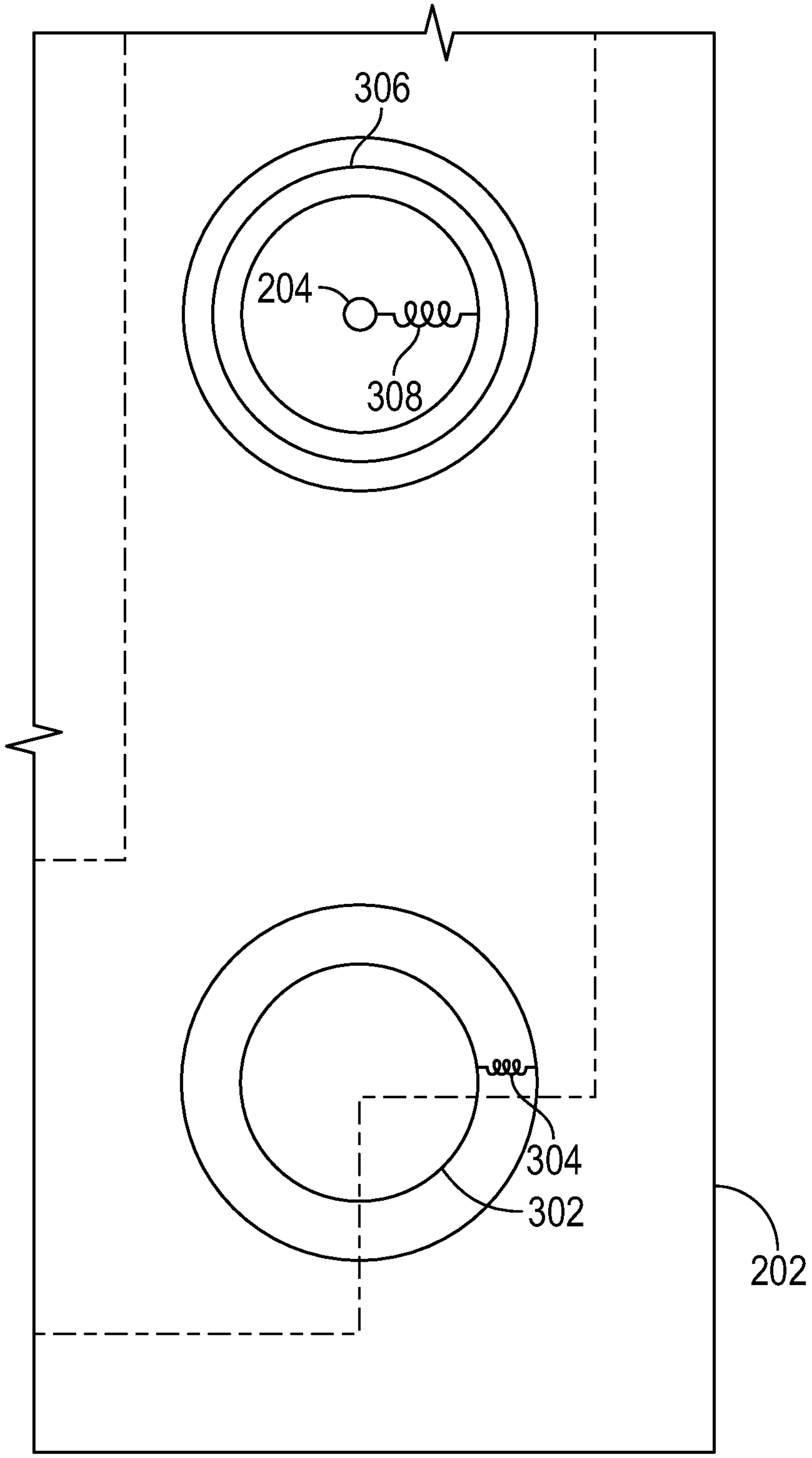
FIG. 4 is a partial close up bottom view of an embodiment of an antenna device including a unit cell.

Referring to FIG. 3, a backside of the embodiment of the antenna device 100 is depicted. FIG. 4 depicts a partial close up view of some of the features of FIG. 3. As shown in FIGS. 3 and 4, most of the backside of the antenna device 100 may be covered by the ground plane 202. However, some features may be etched, or otherwise formed, on the backside as described herein. The antenna device 100 may include a first electrode 302. The first electrode 302 may be coupled to the ground plane 202 via a first RF choke circuit 304. The antenna device 100 may further include a second electrode 306. The second electrode 306 may connect to the first via 204 via a second RF choke circuit 308. Although depicted as inductors, the first RF choke circuit 304 and the second RF choke circuit 308 may include other circuitry as well for filtering and otherwise preparing a biasing voltage. In a particular example, the RF chokes 304, 308, may have an inductance of 39 nH may be inserted for RF blocking. Other possibilities exist.

During operation, a neutral voltage signal may be applied to the first electrode 302. Unwanted variations and/or frequencies in the neutral voltage signal may be filtered by the RF choke 304 to create a neutral or common voltage for the ground plane 202. Because the second via 206, depicted in FIGS. 1-3, electrically couples the second trace 114 to the ground plane 202, the neutral or common voltage may be maintained at the second trace 114.

A biasing voltage may simultaneously be applied to the second electrode 306. The biasing voltage may be filtered by the second RF choke circuit 308 before passing through the first via 204 to the first trace 106. The bias may result in a capacitance at the varactor 118. As the bias changes, the capacitance may also change. By changing the capacitance of the varactor 118, a reflection coefficient of the antenna device 100 may be altered resulting in a corresponding phase change response. This may create a phase delay that may be used for directional transmission and/or reception in an antenna array.

Figure 5:
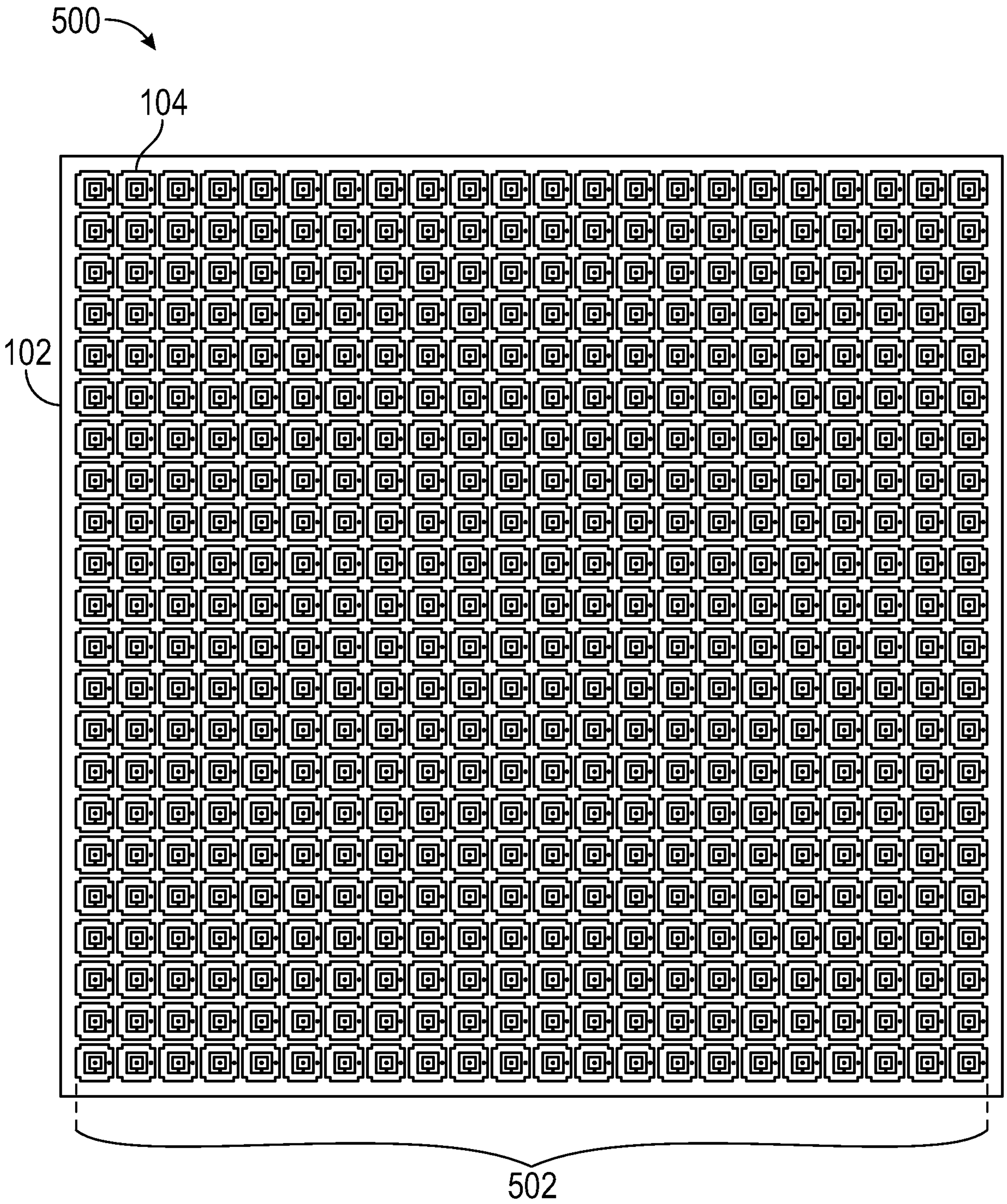
FIG. 5 depicts an antenna system including an array of unit cells.

Referring to FIG. 5, an embodiment of an antenna system 500 is depicted. The antenna system 500 may include an array 502 of unit cells 104 printed on a substrate 102. Although FIG. 5 depicts a 22×22 array, this is for example purposes only. Other configurations are possible depending on a desired application. The unit cells 104 of FIG. 5 may correspond to the descriptions of the unit cell 104 in FIGS. 1-4.

As described above, each unit cell 104 of the array 102 may include a first trace having an outer perimeter that forms a cross shape and an inner perimeter that encloses an area within the first trace. Each unit cell 104 may further include a second trace having an outer perimeter that is completely enclosed by and does not contact the inner perimeter of the first trace. A varactor may electrically connect the first trace to the second trace. Each unit cell 104 may be independently biased, resulting in a programmable phase delay of a reflected signal for each unit cell 104. By aligning phase changes in one or more directions, the array 502 may produce one or more directed beams.

Figure 6:
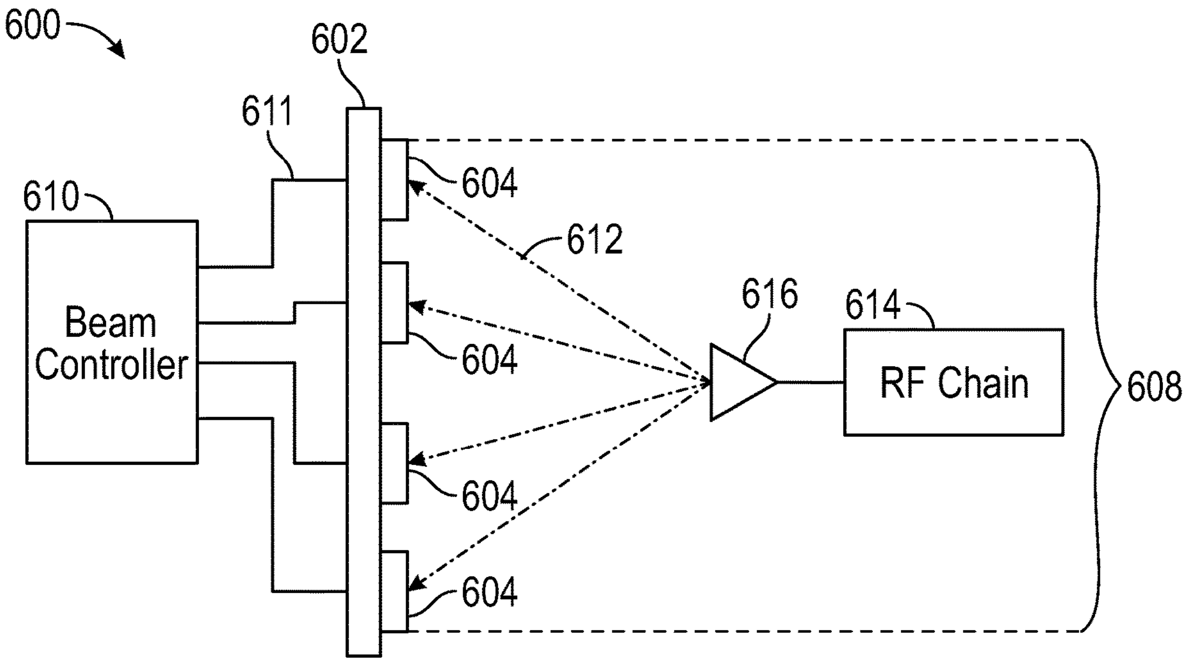
FIG. 6 is a block diagram of a system for signal transmission and/or reception.

Referring to FIG. 6, a system 600 for signal transmission and/or reception is depicted. The system 600 may include a substrate 602 having unit cells 604 formed thereon. The substrate 602 may correspond to the substrate 102 and the unit cells 604 may correspond to the unit cell 104. The unit cells 604 may be arranged in an array 608.

The system 600 may include a beam controller 610 configured to select a capacitance of the varactor of each of the unit cells 604. The capacitance may result in a corresponding phase shift of a reflected electromagnetic signal. Routing circuitry 611 may connect the beam controller 610, individually, to each of the unit cells 604. The beam controller 610 may include circuitry to enable it to perform the functions described herein. For example, the beam controller 610 may include a microcontroller, a central processing unit (CPU), a graphical processing unit (GPU), a digital signal processor (DSP), a peripheral interface controller (PIC), another type of microprocessor, and/or combinations thereof.

The beam controller 610 may be implemented as an integrated circuit, a complementary metal-oxide-semiconductor field-effect-transistor (MOSFET) circuit, a very-large-scale-integrated (VLSI) circuit, a field-programmable gate array (FPGA), an application-specific integrated circuit (ASIC), a combinations of logic gate circuitry, another type of digital or analog electrical design component, or combinations thereof. For purposes of this disclosure, the beam controller 610 may include sufficient memory to perform the functions described herein. The memory may include memory devices such as random-access memory (RAM), read-only memory (ROM), magnetic disk memory, optical disk memory, flash memory, another type of memory capable of storing data and processor instructions, or the like, or combinations thereof.

The system 600 may include an RF chain 614 to upconvert and/or downconvert a signal. The RF chain 614 may include signal amplifiers, signal converters, signal buffers, digital-to-analogue converters, analogue-to-digital converters, modulators, demodulators, signal generators, other types of signal processing circuitry, or combinations thereof. A feed radiator 616 may connected to the RF chain 614 to direct electromagnetic radiation 612 toward the array 608 of unit cells 604.

Figure 7:
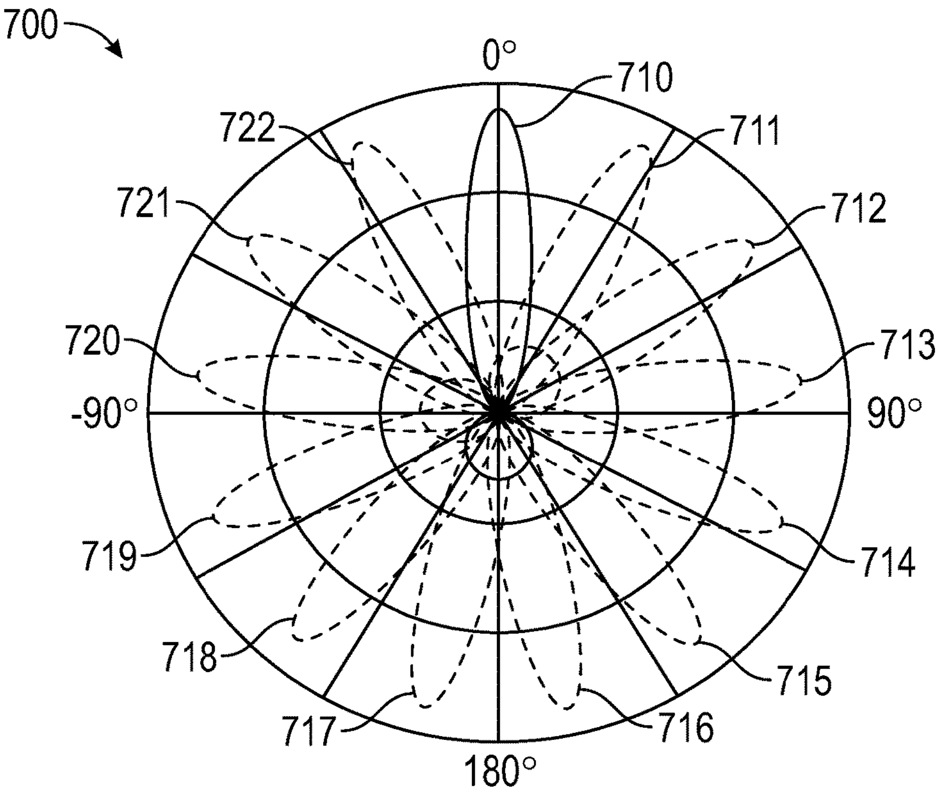
FIG. 7 is a chart depicting an example of a directed beam from an antenna.

During operation, the array 608 of unit cells 604 may reflect the electromagnetic radiation 612. At each of the unit cells 604, the capacitance of the cell's varactor may result in a corresponding phase shift of the electromagnetic signal 612. The beam controller 610 may control the capacitance, and thereby the phase shift, of the electromagnetic signal 612 reflected by each unit cell to generate one or more directed beams from the array 608 of unit cells 604 (as shown in FIG. 7). As opposed to some other designs where people use discrete phase shifts, the proposed design has the ability to provide continuous phase shifts between 0 to 360 degrees. This adds to fine tuning and steering resolution.

Figure 8:
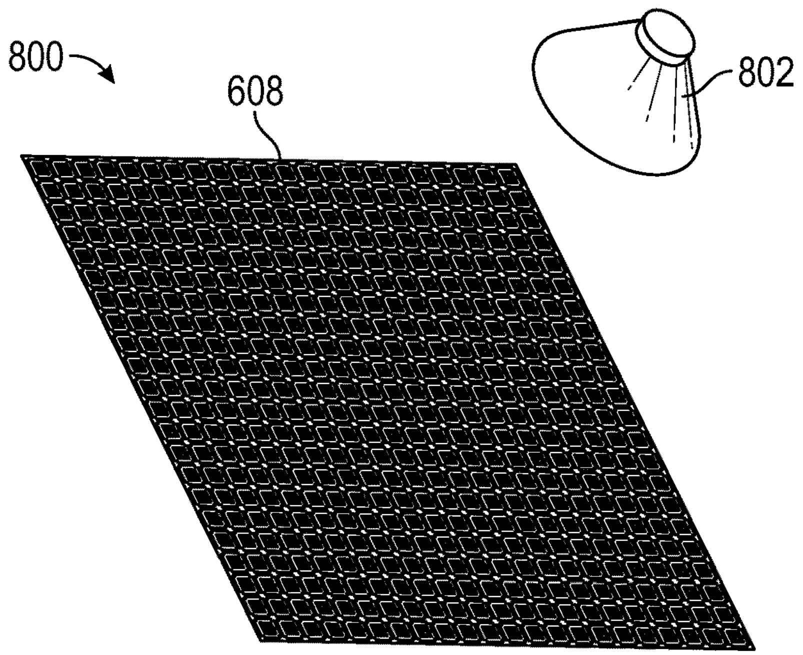
FIG. 8 is a depiction of an antenna system with a horn antenna as a feed source.

FIG. 7 depicts an example of radiation pattern 700 having a directed beam 710 that may be generated by the system 600. By changing the capacitance of individual unit cells of the system 600 the beam 710 may be directed to multiple positions 711, 712, 713, 714, 715, 716, 717, 718, 719, 720, 721, 722, other steering combinations are also possible. In a particular non-limiting example, the reflection coefficient has been studied as a function of diode capacitance to analyze the phase response of a unit cell. By tuning the cell's varactor diode between 0.02 pF to 0.25 pF, a phase agility of 360° may be achieved. Although FIG. 7 only depicts one beam, multiple beams may be possible by phase shifting unit cells in multiple directions along the antenna array FIG. 8 is a depiction of an antenna system 800 with a horn antenna 802 as a feed source. The horn antenna 802 may correspond to the radiator feed 616, while the array 608 provides directed signals to and from the horn antenna 802.

Figure 9:
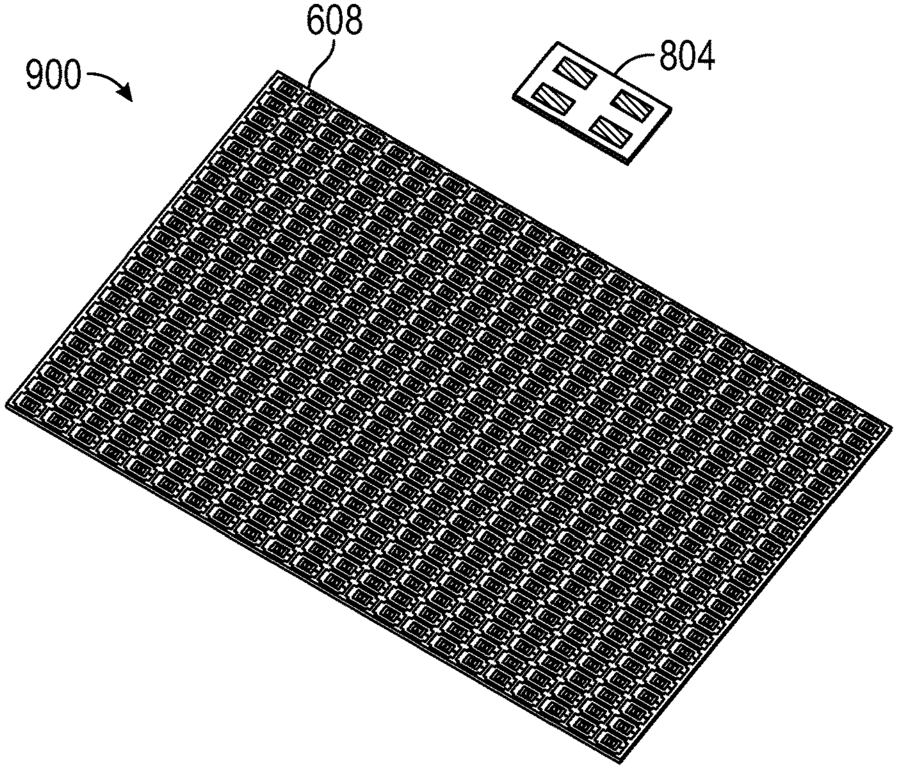
FIG. 9 is a depiction of an antenna system with a planar antenna as a feed source.

FIG. 9 is a depiction of an antenna system 900 with a planar antenna 804 as a feed source. The planar antenna 804 may be made of copper patches, where a number and type of patches may vary. Shown in FIG. 9 are two flat PCBs, one for the array 608 and another for the planar feed antenna 804. This may make the structure low profile, light-weight and conformal to mounting surfaces. Other configurations are possible.

Figure 10:
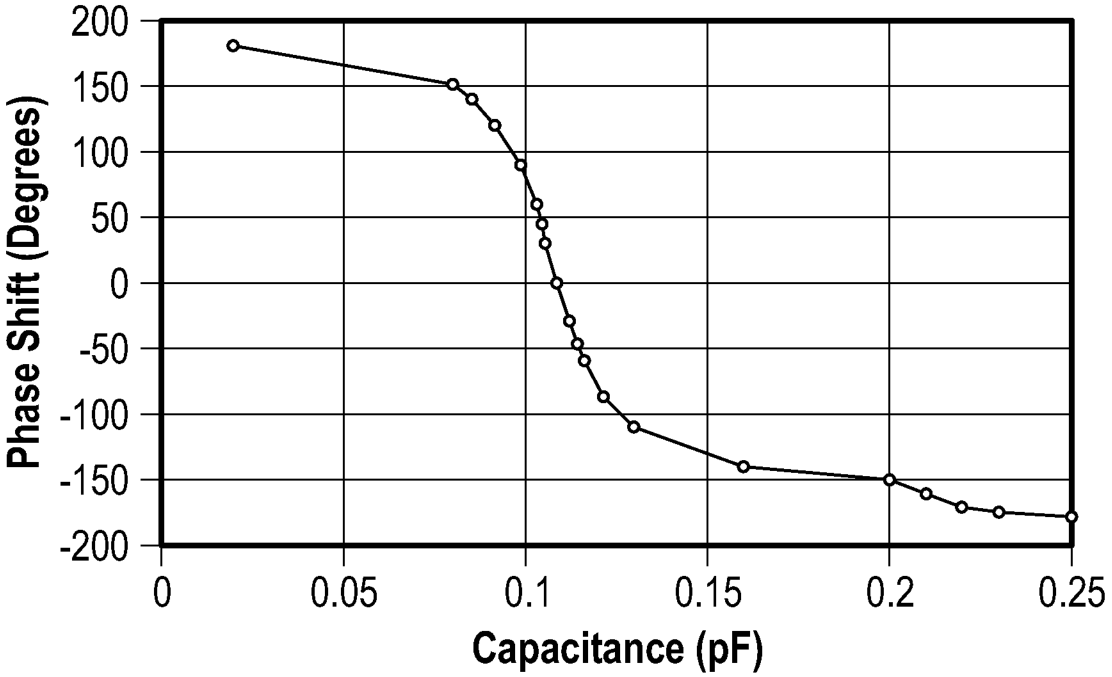
FIG. 10 is a chart depicting a phase shift of an embodiment of a unit cell as a function of capacitance at a varactor of the unit cell.
Figure 11:
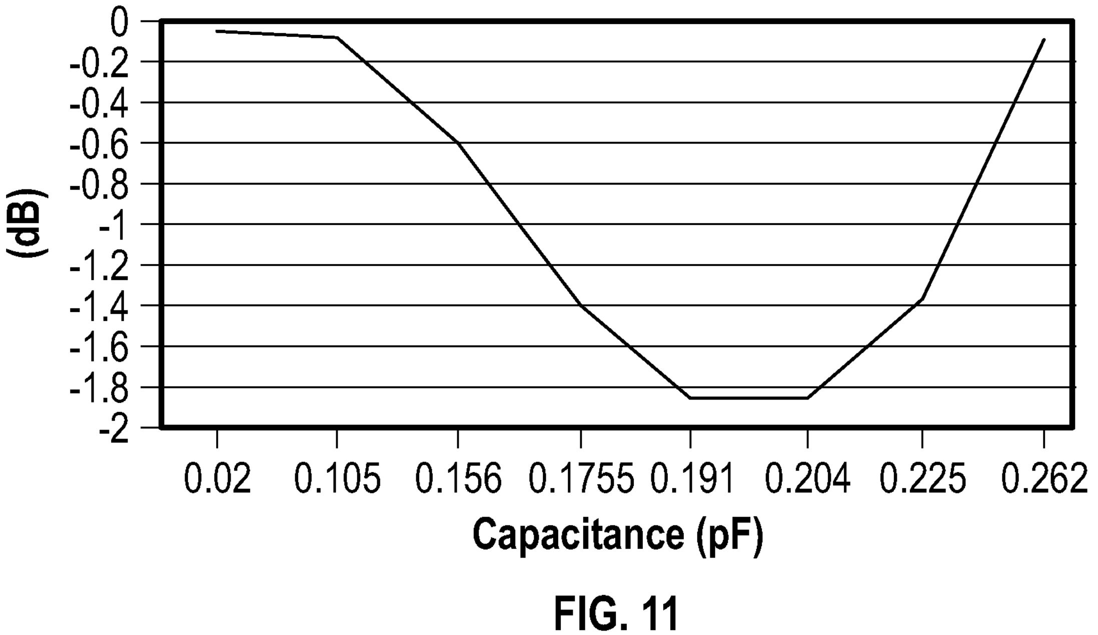
FIG. 11 is a chart depicting a reflection coefficient amplitude for the embodiment of the unit cell.

Referring to FIGS. 10 and 11, simulated results of a unit cell are depicted. FIG. 8 shows a phase shift of the unit cell as a function of capacitance at the varactor of the unit cell. As shown, a phase shift of 180° may be achieved in either direction, resulting in a total of 360° of agility. FIG. 9 depicts a reflection coefficient amplitude for the example unit cell, the maximum reflection loss is −1.82 dB.

Figure 12:
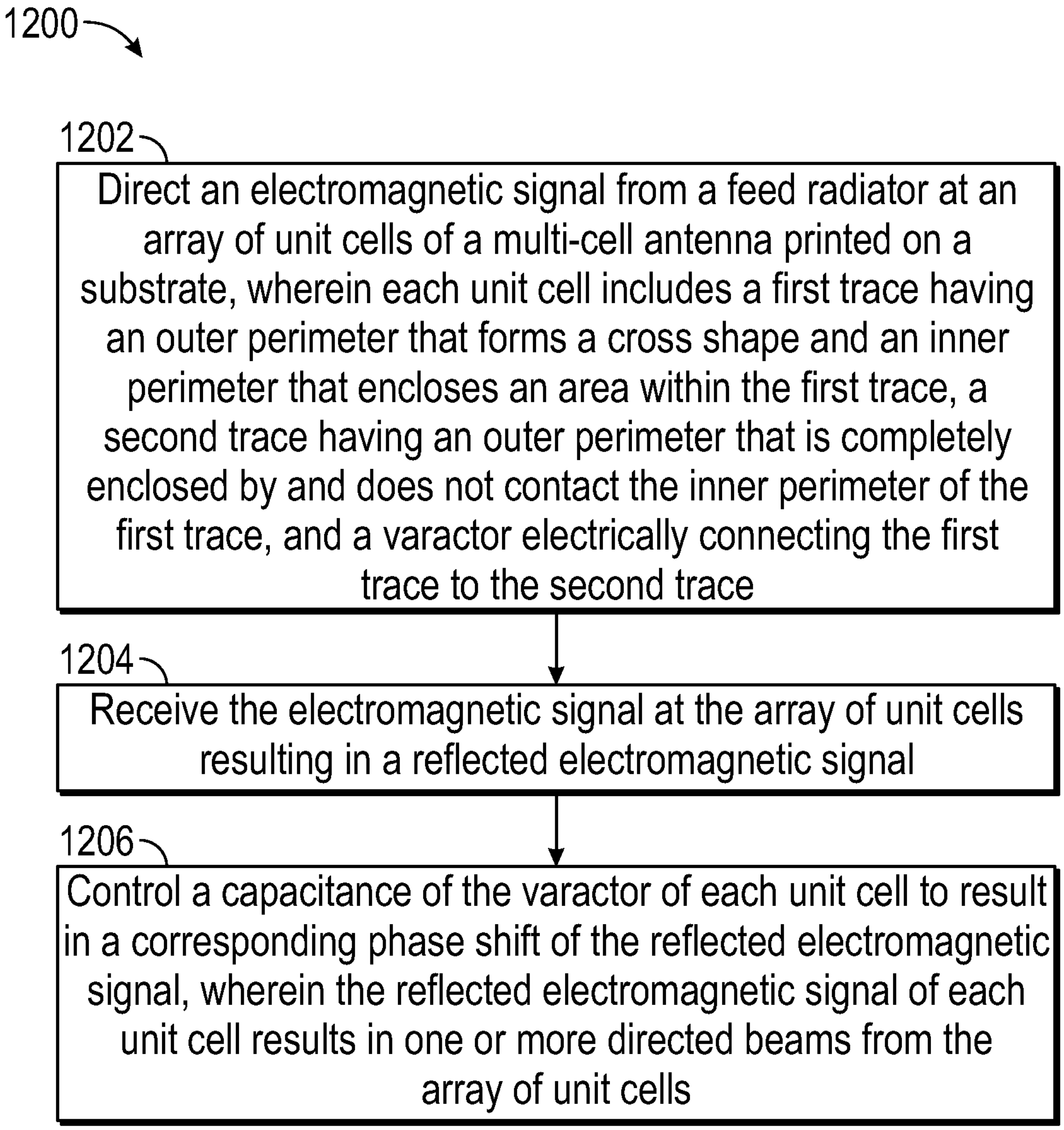
FIG. 12 is a flowchart depicting an embodiment of a method for signal transmission and/or reception.

Referring to FIG. 12, a method 1200 for signal transmission and/or reception is depicted. The method 1200 may include directing an electromagnetic signal from a feed radiator at an array of unit cells of a multi-cell antenna printed on a substrate, where each unit cell includes a first trace having an outer perimeter that forms a cross shape and an inner perimeter that encloses an area within the first trace, a second trace having an outer perimeter that is completely enclosed by and does not contact the inner perimeter of the first trace, and a varactor electrically connecting the first trace to the second trace, at 1202. For example, the electromagnetic signal 612 may be directed at the array 608 of unit cells 604 by the feed radiator 616.

The method 1200 may further include receiving the electromagnetic signal at the array of unit cells resulting in a reflected electromagnetic signal, at 1204. For example, the electromagnetic signal 612 may be received at the array 608.

The method 1200 may also include controlling a capacitance of the varactor of each unit cell to result in a corresponding phase shift of the reflected electromagnetic signal, where the reflected electromagnetic signal of each unit cell results in one or more directed beams from the array of unit cells, at 1204. For example, the beam controller 610 may control a capacitance of the varactor of each unit cell 604 to result in the directed beam 710.

Figure 13:
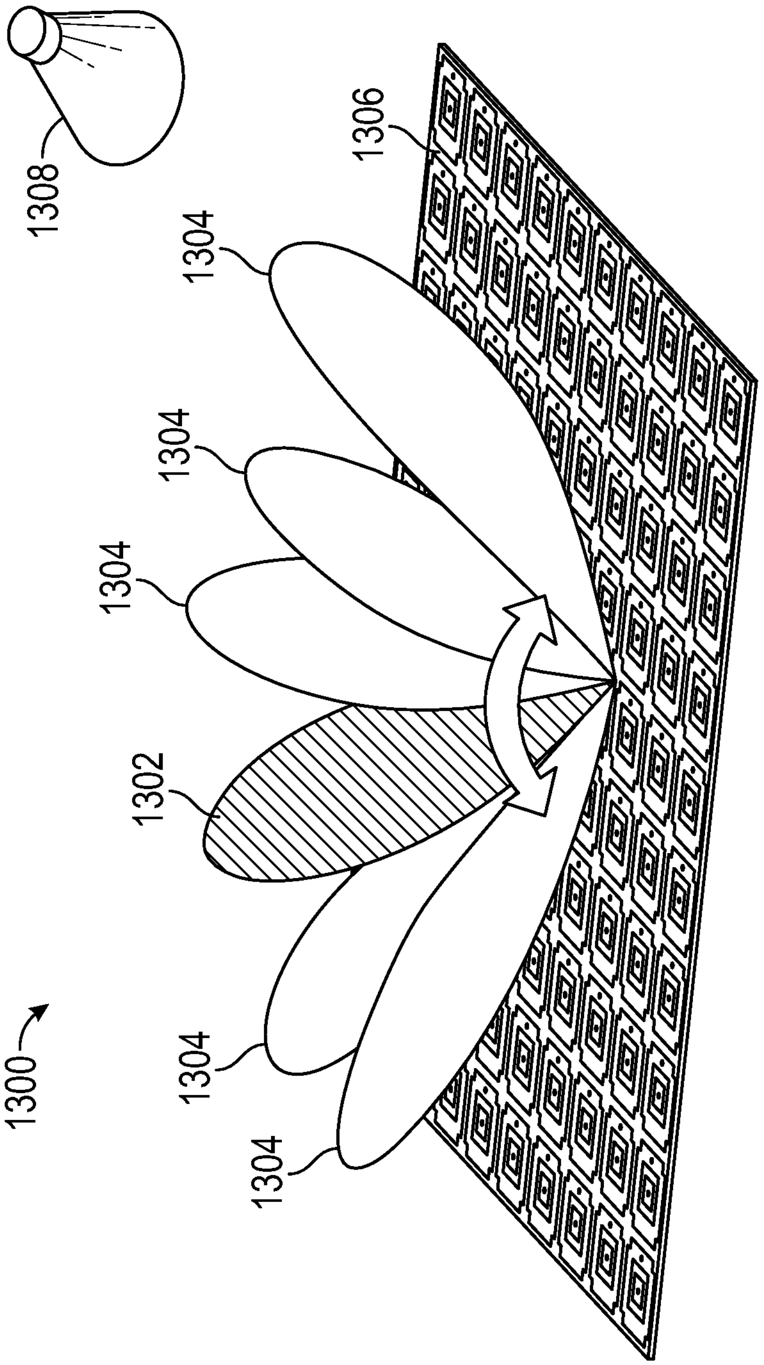
FIG. 13 depicts an example of a directed beam that can be steered in multiple directions by an embodiment of an antenna system.

Referring to FIG. 13, an example of a system 1300 is depicted. The system 1300 may include an array 1306 of unit cells. Although FIG. 13 depicts the array 1306 as being a 10×10 array, as explained herein, any number of cells may be used, depending on how the system 1300 is applied. A feed source 1308 is also depicted. The array 1306 may reflect signals to and from the feed source 1308 and, using phase shift steering techniques, may generate a directed radiation beam 1302. By altering the phase shift at each unit cell of the array 1308, the beam 1302 may be rotated to different positions 1304. In this way, the directed beam 1302 can be steered in multiple directions.

Although various embodiments have been shown and described, the present disclosure is not so limited and will be understood to include all such modifications and variations as would be apparent to one skilled in the art.

What is claimed is:

1. A device comprising:

a substrate having a unit cell for a multi-cell antenna printed on the substrate, wherein the unit cell comprises:

a square-cross hybrid trace having an outer perimeter that forms a cross shape, and an inner perimeter that forms a square shape and encloses an area within the square-cross hybrid trace;

a square trace having an outer perimeter that forms a square shape and is completely enclosed by and does not contact the inner perimeter of the square-cross hybrid trace; and a varactor electrically connecting the first square-cross hybrid trace to the square trace.

2. The device of claim 1, wherein the unit cell omits any additional varactor electrically connecting the square-cross hybrid trace to the square trace.

3. The device of claim 1, wherein the square-cross hybrid trace and the square trace are printed on the substrate as a single layer.

4. The device of claim 1, further comprising:

a grounding plane; and a via passing through the substrate and electrically connecting the square trace to the grounding plane.

5. The device of claim 1, further comprising:

a radio frequency choke circuit; and a via passing through the substrate and electrically connecting the square-cross hybrid trace to the radio frequency choke circuit.

6. The device of claim 1, wherein a capacitance of the varactor is configured to be selectively set between 0.02 pF and 0.25 pF.

7. The device of claim 1, wherein a length and width of the unit cell are about 0.35 times a wavelength of a signal for which the multi-cell antenna is designed.

8. The device of claim 1, wherein the square-cross hybrid trace and the square trace comprise silver, copper, aluminum, tin, or a combination thereof.

9. A system comprising:

a substrate;

an array of unit cells for a multi-cell antenna printed on the substrate, wherein each unit cell comprises:

a square-cross hybrid trace having an outer perimeter that forms a cross shape and an inner perimeter that forms a square shape and encloses an area within the square-cross hybrid trace;

a square trace having an outer perimeter that is completely enclosed by and does not contact the inner perimeter of the square-cross hybrid trace; and a varactor electrically connecting the square-cross hybrid trace to the square trace.

10. The system of claim 9, further comprising a feed radiator configured to direct electromagnetic radiation toward the array of unit cells.

11. The system of claim 10, further comprising a radio frequency chain coupled to the feed radiator.

12. The system of claim 9, further comprising a beam controller configured to select a capacitance of the varactor of each unit cell.

13. The system of claim 12, wherein the capacitance of the varactor of each unit cell results in a corresponding phase shift of an electromagnetic signal reflected by each unit cell.

14. The system of claim 13, wherein the phase shift of the electromagnetic signal reflected by each unit cell results in one or more directed beams from the array of unit cells.

15. The system of claim 9, wherein each unit cell includes a single varactor electrically connecting the square-cross hybrid trace to the square trace.

16. The system of claim 9, wherein the square-cross hybrid trace and the square trace are printed on the substrate as a single layer.

17. The system of claim 9, further comprising:

a grounding plane; and vias passing through the substrate and, for each unit cell, electrically connecting the square trace to the grounding plane.

18. The system of claim 9, further comprising:

a radio frequency choke circuit for each unit cell; and vias passing through the substrate and, for each unit cell, electrically connecting the square-cross hybrid trace to the radio frequency choke circuit.

* * * * *